(12) United States Patent
Yamaura

(10) Patent No.: US 7,746,943 B2
(45) Date of Patent: Jun. 29, 2010

(54) WIRELESS COMMUNICATION SYSTEM, WIRELESS COMMUNICATION APPARATUS AND WIRELESS COMMUNICATION METHOD

(75) Inventor: Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 664 days.

(21) Appl. No.: 11/790,592

(22) Filed: Apr. 26, 2007

(65) Prior Publication Data

US 2007/0258541 A1  Nov. 8, 2007

(30) Foreign Application Priority Data

Apr. 27, 2006 (JP) .............................. 2006-124535
Mar. 6, 2007 (JP) .............................. 2007-056246

(51) Int. Cl.
*H04K 1/10* (2006.01)
*H04L 27/18* (2006.01)

(52) U.S. Cl. ................... 375/260; 375/267; 375/299; 375/347; 375/349; 455/500; 455/101

(58) Field of Classification Search ................. 375/260, 375/267, 299, 347, 349, 219, 220, 221; 455/500, 455/101

See application file for complete search history.

(56) References Cited

U.S. PATENT DOCUMENTS

| | | | |
|---|---|---|---|
| 6,859,503 B2 * | 2/2005 | Pautler et al. ............... | 375/299 |
| 7,486,720 B2 * | 2/2009 | Molisch et al. ............. | 375/219 |
| 2004/0178954 A1 * | 9/2004 | Vook et al. .................. | 342/383 |
| 2004/0192218 A1 * | 9/2004 | Oprea .......................... | 455/73 |
| 2005/0053170 A1 * | 3/2005 | Catreux et al. ............. | 375/267 |
| 2006/0068718 A1 * | 3/2006 | Li et al. ....................... | 455/69 |
| 2007/0201575 A1 * | 8/2007 | Ariyavisitakul et al. ..... | 375/267 |
| 2008/0108310 A1 * | 5/2008 | Tong et al. ................... | 455/69 |

FOREIGN PATENT DOCUMENTS

JP           2002-44051           2/2002

OTHER PUBLICATIONS http://radio3.ee.uec.ac.jp/MIMO(IEICE_TS).pdf, pp. 32-35, (as of Oct. 24, 2003).
A. Benjebbour, et al., "Performance of iterative successive detection algorithm with space-time transmission," Proc. IEEE VTC Spring, vol. 2 (2001), pp. 1287-1291.
A. Benjebbour, et al., "Comparison of ordered successive receivers for space-time transmission," Proc. IEEE VTC Fall, vol. 4 (2001), pp. 2053-2057.

* cited by examiner

*Primary Examiner*—Phuong Phu
(74) *Attorney, Agent, or Firm*—Finnegan, Henderson, Farabow, Garrett and Dunner, L.L.P.

(57) ABSTRACT

A wireless communication system which performs data transmission from a first terminal including N antennas to a second terminal including M antennas using spatially multiplexed streams (N and M are integers larger than or equal to 2 and N<M) is disclosed. The system includes training request means, training means, channel matrix preparing means, transmission weight matrix computation means, and beamforming means.

13 Claims, 9 Drawing Sheets

WIRELESS COMMUNICATION SYSTEM, WIRELESS COMMUNICATION APPARATUS AND WIRELESS COMMUNICATION METHOD

CROSS REFERENCES TO RELATED APPLICATIONS

The present invention contains subject matter related to Japanese Patent Application JP 2006-124535 filed in the Japanese Patent Office on Apr. 27, 2006, the entire contents of which being incorporated herein by reference.

BACKGROUND

1. Technical Field

The invention relates to a wireless communication system, a wireless communication apparatus and a wireless communication method using spatial multiplexing, and more particularly, to a wireless communication system, a wireless communication apparatus and a wireless communication method, in which a transmitter and a receiver share channel information to perform closed loop type spatial multiplexing transmission.

In particular, the invention relates to a wireless communication systems a wireless communication apparatus and a wireless communication method, which perform beamforming by obtaining a channel matrix on the basis of training series transmitted from a receiver when a transmitter transmits a packet, and more particularly, to a wireless communication system, a wireless communication apparatus and a wireless communication method, which perform beamforming using the training series transmitted from the transmitter to the receiver when the number of antennas of the transmitter which is a beamformer is smaller than that of the receiver which is a beamformee.

2. Background Art

As a system for removing wire in an existing wired communication method, a wireless network is attracting attention. A standard of the wireless network may be the IEEE (The institute of Electrical and Electronics Engineers) 802.11 or the IEEE 802.15.

For example, in the IEEE 802.11a/g, as a standard of a wireless LAN, an orthogonal frequency division multiplexing (OFDM) modulation method which is one of a multi-carrier method is employed. In the OFDM modulation method, since transmission data is distributed to a plurality of carriers having orthogonal frequencies and is transmitted, the band of each carrier becomes narrow, frequency use efficiency is very high, and resistance to frequency-selective fading interference is strong.

In addition, in the IEEE 802.11a/g standard, a modulation method for accomplishing a communication speed of a maximum of 54 Mbps is supported, but a next-generation wireless LAN standard for realizing a new high bit rate is required.

As one of a technology of realizing a high speed of wireless communication, multi-input multi-output (MIMO) communication is attracting attention. This is a communication method in which both a transmitter side and a receiver side respectively include a plurality of antennas to realize spatially multiplexed streams. The transmitter side performs spatial/temporal encoding and multiplexing of plural pieces of transmission data and distributes and transmits the plural pieces of transmission data to N transmission antennas through channels. The receiver side performs spatial/temporal decoding of reception signals received by M reception antennas through the channels to obtain reception data without crosstalk between the streams (for example, see JP-A-2002-44051 (Patent Document 1)). Ideally, spatial streams corresponding to the smaller number (MIN [N, M]) of the transmission and reception antennas are formed.

According to the MIMO communication method, a transmission capacity can increase according to the number of antennas and a communication speed improvement can be realized, without increasing a frequency band. Since the spatial multiplexing is used, frequency use efficiency is high. The MIMO method uses channel characteristics and is different from a simple transmission/reception adaptive array. For example, in the IEEE 802.11n which is the extension standard of the IEEE 802.11a/g, an OFDM_MIMO method using OFDM in primary modulation is employed. Currently, the IEEE 802.11n is being standardized in a task group n(TGn) and a specification established therein is based on a specification established in Enhanced wireless consortium (EWC) formed on October, 2005.

In the MIMO communication, in order to spatially divide a spatially multiplexed reception signal y into the stream signals x, a channel matrix H is acquired by any method and the spatially multiplexed reception signal needs to be spatially divided into a plurality of original streams using the channel matrix H by a predetermined algorithm.

The channel matrix H is obtained by allowing a transmitter/receiver side to transmit/receive existing training series, estimating the channels by a difference between the actually received signal and the existing series and arranging propagation channels of a combination of transmission and reception antennas in a matrix form. When the number of transmission antennas is N and the number of reception antennas is M, the channel matrix is M×N (row×column) matrix. Accordingly, the transmitter side transmits N training series and the receiver side acquires the channel matrix H using the received training series.

A method of spatially dividing a reception signal is largely classified into an open loop type method in which a receiver independently performs spatial division on the basis of the channel matrix H and a closed loop type method in which a transmitter side gives transmission antenna weights on the basis of the channel matrix to perform adequate beamforming toward a receiver to form an ideal spatial orthogonal channel.

As an open loop type MIMO transmission method, there is a zero force (for example, see A.Benjebbour, H.Murata and S.Yoshida, "Performance of iterative successive detection algorithm for space-time transmission", Proc. IEEE VTC Spring, vol. 2, pp. 1287-1291, Rhodes. Greece, May 2001 (Non-Patent Document 1)) or a minimum mean square error (MMSE) (for example, see A.Benjebbour, H.Murata and S.Yoshida, "Performance comparison of ordered successive receivers for space-time transmission", Proc. IEEE VTC Fall, vol. 4, pp. 2053-2057, Atlantic City, USA, September 2001 (Non-Patent Document 2)). The open loop type MIMO transmission method is a relative simple algorithm for obtaining reception weight matrix W for spatially dividing the reception signal from the channel matrix H, in which a feedback operation for sharing the channel information between the transmitter and the receiver is omitted and the transmitter and the receiver independently perform spatial multiplexing transmission.

As an ideal one of a closed loop type MIMO transmission method, a singular value decomposition (SVD)-MIMO method using SVD of the channel matrix H is known (for example, see http://radio3.ee.uec.ac.jp/MIMO(IEICE_TS).pdf (as of Oct. 24, 2003) (Non-Patent Document 3)). In the SVD-MIMO transmission, a numerical matrix having channel information corresponding to antenna pairs as elements, that is, a channel information matrix H, is subjected to the singular value decomposition to obtain $UDV^H$. A transmitter side uses V in a transmission antenna weight matrix and transmits a beamformed packet to a receiver and a receiver side typically gives $(UD)^{-1}$ as a reception antenna weight matrix. Here, D is a diagonal matrix having square roots of singular values $\lambda_i$ corresponding to qualities of the spatial streams in diagonal elements (the subscript i indicates an $i^{th}$ spatial stream). The singular values $\lambda_i$ are arranged in the diagonal elements of the diagonal matrix D in ascending order and power ratio distribution or modulation method allocation is performed according to communication quality represented by the level of the singular value with respect to the streams such that a plurality of spatial orthogonal multiplexed propagation channels which are logically independent are realized. The receiver side can extract a plurality of original signal series without crosstalk and theoretically accomplish maximum performance.

In the closed loop type MIMO communication system, adequate beamforming is performed when the transmitter transmits the packet, but information on the channel information needs to be fed back from the receiver side for receiving the packet.

For example, in the EWC HT (High Throughput) MAC (Media Access Control) Specification Version V1.24, two kinds of procedures, that is, "implicit feedback" and "explicit feedback", are defined as the procedure for feeding back the information on the channel matrix between the transmitter and the receiver.

In the "implicit feedback", the transmitter estimates a backward channel matrix from the receiver to the transmitter using training series transmitted from the receiver, and a forward channel matrix from the transmitter to the receiver is computed to perform beamforming on the assumption that bidirectional channel characteristics between the transmitter and the receiver are reciprocal. Calibration of an RF circuit in a communication system is performed such that the channel characteristics are reciprocal.

In the "explicit feedback", the receiver estimates a forward channel matrix from the transmitter to the receiver using training series transmitted from the transmitter and returns a packet including the channel matrix as data to the transmitter, and transmitter performs the beamforming using the received channel matrix. Alternatively, the receiver computes a transmission weight matrix for allowing the transmitter to perform the beamforming from the estimated, channel matrix and returns a packet including the transmission weight matrix as the data to the transmitter. In the explicit feedback, since the weight matrix is computed on the basis of the estimated forward channel matrix, it may not be assumed that the channels are reciprocal.

In view of packet transmission, the transmitter is an initiator and the receiver is a receiver. However, in view of beamforming, the initiator for transmitting the packet is a beamformer and the receiver for receiving the beamformed packet is a beamformee. Communication from the beamformer to the beamformee is referred to as "forward" and communication from the beamformee to the beamformer is referred to as "backward".

For example, when an access point (AP) transmits a data frame to a client terminal (STA) as the beamformer, according to the implicit feedback, the client terminal as the beamformee may only return the training series to the access point for beamforming.

A frame exchange procedure for transmitting the beamforming from the access point to the client terminal by the implicit feedback will be described with reference to FIG. 12.

First, the access point requests the client terminal to transmit the training series. According to the EWC MAC specification, a link adaptation control field (see FIG. 13) in the HT control field (see FIG. 14) of an MAC frame includes a bit called training request (TRQ) and arranging of 1 in this bit corresponds to the transmission request of the training series.

The client terminal returns a sounding packet. The sounding packet includes the training series corresponding, to the number N of transmission antennas of the access point and the number M of reception antennas of the client terminal. The access point can estimate an N×M backward channel matrix when receiving the sounding packet. The access point computes a forward transmission weight matrix for beamforming using the SVD, an Eigen value decomposition (EVD) or the other matrix decomposition and multiplies transmission signal from the antennas by the transmission weight matrix such that the beamformed packet can be sent to the client terminal. By the beamforming, communication can be performed at a high transmission rate even in a place where the packet was hard to be received in the past.

Subsequently, an operation for allowing the beamformer to perform the beamforming using the training series from the beamformee according to the implicit feedback will be described with reference to FIG. 15. In the same drawing, a STA-A having three antennas is the beamformer and a STA-B having two antennas is the beamformee. In the below-described description or equations, a subscript AB indicates forward transmission from, the STA-A to the STA-B and a subscript BA indicates backward transmission from the STA-B to the STA-A. A numerical subscript corresponds to the antenna number of the corresponding terminal. It is assumed that the channels between the STA-A and the STA-B are reciprocal. Accordingly, a backward channel matrix $H_{BA}$ becomes a transposed matrix of a forward channel matrix $H_{AB}$ ($H_{BA}=H_{AB}{}^t$).

The training series transmitted from the antennas of the STA-B are ($t_{BA1}, t_{BA2}$) and the signals received by the antennas of the STA-A through a channel $H_{BA}$ are ($r_{BA1}, r_{BA2}, r_{BA3}$), the following equation is obtained.

$$\begin{pmatrix} r_{BA1} \\ r_{BA2} \\ r_{BA3} \end{pmatrix} = H_{BA} \begin{pmatrix} t_{BA1} \\ t_{BA2} \end{pmatrix} \qquad \text{Equation 1}$$

where, the channel matrix $H_{BA}$ is a 3×2 matrix and expressed by the following equation. But, $h_{ij}$ is a channel characteristic value of $j^{th}$ antenna of the STA-B to $i^{th}$ antenna of the STA-A.

$$H_{BA} = \begin{pmatrix} h_{11} & h_{12} \\ h_{21} & h_{22} \\ h_{31} & h_{32} \end{pmatrix} \qquad \text{Equation 2}$$

When the channel matrix $H_{BA}$ is subjected to singular value decomposition, the following equation is obtained. Here, $U_{BA}$ is a matrix having an inherent normalized vector of $H_{BA}H_{BA}{}^H$, $V_{BA}$ is an inherent normalized vector of $H_{BA}{}^H H_{BA}$ and $D_{BA}$ is a diagonal matrix having a square root of an inherent vector of $H_{BA}H_{BA}{}^H$ or $H_{BA}{}^H H_{BA}$ as the diagonal elements. In addition, $U_{BA}$ and $V_{BA}$ are unitary matrices and complex conjugate transposed matrices thereof become inverse matrices.

$$H_{BA} = U_{BA} D_{BA} V_{BA}{}^H \qquad \text{Equation 3}$$

The transmission weight matrix necessary for performing beamforming of the frame transmitted from the STA-A to the STA-B is the matrix $V_{AB}$ obtained by performing the singular value decomposition with respect to the forward channel matrix $H_{AB}$. Here, since the channels between the STA-A and the STA-B are reciprocal and the backward channel matrix $H_{BA}$ becomes the transposed matrix of the forward channel matrix $H_{AB}$, the singular value decomposition of the channel matrix $H_{AB}$ is computed as follows.

$$H_{AB} = U_{AB} D_{AB} V_{AB}^H = V_{BA}^* D_{BA} U_{BA}^T \qquad \text{Equation 4}$$

When the reciprocity of the channels is used, a desired transmission weight matrix $V_{AB}$ is expressed by the following equation.

$$V_{AB} = (V_{AB}^H)^H = (U_{BA}^T)^H = ((U_{BA}^T)^T)^* = U_{BA}^* \qquad \text{Equation 5}$$

That is, it is possible to perform the beamforming using the complex conjugate matrix of $U_{BA}$ obtained by performing the singular value decomposition with respect to the channel matrix estimated on the basis of the training signal from the STA-B.

If the transmission signal of the STA-A is x and a reception signal from the. STA-B is y, the reception signal becomes $Y = H_{AB} X$ in a case where the beamforming is not performed (un-steered), but the reception signal y becomes the following equation in a case where the beamforming are performed by the transmission weight matrix $V_{AB}$ (steered)

$$y = H_{AB} V_{AB} X = (U_{AB} D_{AB} V_{AB}^H) \cdot V_{AB} X = U_{AB} D_{AB} X \qquad \text{Equation 6}$$

Accordingly, the STA-B can perform spatial division of the original stream by multiplying the reception signals by $D_{AB}^{-1} U_{AB}^H$ as a reception weight.

As described above, according to the implicit feedback, since the burden on the beamformee due to the feedback is reduced, it is suitable for a case where the access point (AP) transmits a data frame to the client terminal STA as the beamformer. However, in this case, the terminal which is the beamformer computes the transmission weight matrix for beamforming by performing the singular value decomposition or the other calculation with respect to the channel matrix estimated from the received training series. This calculation has a high load and the processed load increases depending on the number of streams of the training series transmitted from the beamformee.

In an example shown in FIG. 15, since the number N (=3) of antennas of the STA-A is larger than the number M (=2) of antennas of the STA-B, no problem is caused in the processing capability for beamforming. This is because the STA-A is designed to include the processing capability corresponding to the number N of its own streams and the training series of the spatial streams of N or less are divided, an N×M channel matrix is constructed from the divided training series, and the matrix for beamforming is computed based on the N×M channel matrix.

However, in a case of N<M, that is, the number of antennas of the beamformee is larger than that of the beamformer, problems may be caused because the beamformer does not include the processing capability which exceeds the number of its own spatial streams. When the STA-A can process only streams of N which is equal to the number of antennas, M stream trainings may not be divided or the matrix for beamforming may not be obtained from the N×M estimation channel matrix.

As a method for solving such problems without deteriorating the beamforming characteristic, it may be considered that a channel estimation maximum dimension $M_{max}$ corresponding to a rated maximum number of antennas is given to the STA-A as the beamformer (for example, if it is based on the IEEE specification, $M_{max}=4$) and the processing capability for computing the transmission weigh matrix for beamforming is given to the obtained N×$M_{max}$ estimation channel matrix.

For example, when the number of antennas of the STA-A is N=2 and the rated maximum number of antennas is $M_{max}=4$, the STA-A can compute only a 2×2 matrix in consideration of the communication with the terminal having the same number of antenna, but needs to compute a 2×4 matrix. In this case, since calculation or processing circuit needs to be doubled, miniaturization or low cost of the apparatus is hard to be realized.

SUMMARY OF THE INVENTION

It is desirable to provide an excellent wireless communication system, wireless communication apparatus and wireless communication method, which are capable of performing communication at a high transmission rate by a beamformed packet by allowing a terminal which operates as a beamformer to divide spatial stream training transmitted from a terminal which operates as a beamformee, to construct an estimation channel matrix from the divided training series, and to suitably obtain a transmission channel matrix for beamforming on the basis of the channel matrix.

It is also desirable to provide an excellent wireless communication system, wireless communication apparatus and wireless communication method, which are capable of suitably performing beamforming without deteriorating beamforming characteristics or increasing a processing capability of channel estimation or a computing capability of a matrix for beamforming in the beamformer even when the number of antennas of a terminal which is a beamformer is smaller than that of a beamformee.

According to an embodiment of the invention, there is provided a wireless communication system which performs data transmission from a first terminal including N antennas to a second terminal including M antennas using spatially multiplexed streams (N is an integer of 2 or more and M is an integer of 1 or more), the system including: training request means for requesting transmission of a training signal for exciting a backward channel from the first terminal to the second terminal; training means for transmitting a packet including training series for exciting an N×M backward channel matrix from the second terminal to the first terminal in response to the request; channel matrix preparing means for dividing the training series received by the antennas of the first terminal and constructing the backward channel matrix; transmission weight matrix computation means for obtaining a N×N transmission weight matrix for beamforming at the time of forward data transmission using an N×N channel matrix composed of N columns included in the backward channel matrix in consideration of the number N of antennas of the first terminal, in a case of N<M; and beamforming means for performing, beamforming in transmission signals from the antennas of the first terminal using the transmission weight matrix for beamforming when a data packet is transmitted from the first terminal to the second terminal.

The term "system" described herein indicates a logical set of apparatuses (or function modules for realizing specific functions) and it is not specially considered whether the apparatuses or the function modules are included in a single casing (the same is true in the below description).

As a technology for realizing a high speed of wireless communication, there is an MIMO communication method which includes a plurality of antenna elements in a transmitter side and a receiver side and realizes spatially multiplexed streams. In particular, in a closed loop type MIMO communication system, a terminal of a data packet transmission side performs beamforming on the basis of feedback of information on an estimation channel matrix from a terminal of a reception side such that a plurality of spatial orthogonal multiplexed propagation channels which are logically independent are realized and the receiver side can extract a plurality of original signal series without crosstalk, thereby theoretically accomplishing maximum performance.

As a procedure of performing feedback of the channel matrix from the terminal of the reception side to the terminal of the transmission side, for example, two kinds of procedures, that is, "implicit feedback" and "explicit feedback", are defined in the EWC HT MAC specification. Among them, in the implicit feedback, the first terminal which operates as a beamformer divides spatial stream training transmitted from a second terminal which operates as a beamformee, constructs a backward estimation channel matrix from the divided training series, and performs beamforming of a transmission packet using a transmission channel matrix for beamforming obtained on the basis of the channel matrix to perform communication, on the assumption that the bidirectional channel characteristics between the transmitter and the receiver are reciprocal.

For example, when the access point transmits the data frame to the client terminal as the beamformer, according to the implicit feedback, the client terminal as the beamformee only returns the training series to the access point, in order to perform the beamforming.

However, in a case of N<M, that is, the number of antennas of the second terminal is larger than that of the first terminal, since the first terminal operating as the beamformer does not include the processing capability which exceeds the number of its own spatial streams, the first terminal may not divide M stream trainings or obtain the matrix for beamforming from the N×M estimation channel matrix.

In the wireless communication system according to the embodiment of the invention, when the beamforming based on the backward channel estimation result is performed according to the implicit feedback, the first terminal operating the beamformer receives the sounding packet fed back from the second terminal operating as the beamformee, divides the sounding packet into M spatial stream trainings, constructs an N×M backward channel matrix, and obtains an N×N transmission weight matrix for beamforming at the time of the forward data transmission using the N×N channel matrix composed of N columns of M columns included in the backward channel matrix in consideration of the number of its own antennas (for example, a case of N<M), that is, performs computation for decreasing the beamforming dimension.

Accordingly, according to the wireless communication system of the embodiment of the invention, when the closed loop type MIMO communication is performed by the implicit feedback procedure, the first terminal operating as the beamformer needs to include processing capability corresponding to a rated maximum number of antennas (for example, four in the IEEE specification) in a circuit module for estimating a channel matrix, but can reduce the size of the circuit for computing the transmission weight matrix for beamforming from the estimated channel matrix to of the order of $(N/M)^2$.

In the above-described procedure, when the spatial stream training for exciting the N×M channel matrix is fed back from the second terminal, the first terminal can reduce the size of the circuit for computing the transmission weight matrix for beamforming, but may not reduce a circuit module for estimating the channel. Therefore, when the second terminal transmits the sounding packet with the staggered format, the circuit module for estimating the channel can be reduced.

The staggered format described herein is the format of the sounding packet obtained by temporally dividing the training signal for exciting the channel of the spatial dimensions larger than or equal to the number of streams of the data and a training signal part used for a space division process of a data part. When a terminal having a plurality of antennas performs spatially multiplexing transmission, the transmission is not performed using all antenna branches. However, the beamformee returns the training signal even through the stream, which is not used for the space division process of the data part, to excite the channel of all the spatial dimensions when feeding back the sounding packet.

In this case, the first terminal performs the channel estimation using only the training signal part used for the space division process of the data part such that the training signal for exciting the channel of the spatial dimensions larger than or equal to the number of streams of the data transmitted with temporal separation, thereby reducing the size of a channel matrix estimation circuit. For example, the first terminal estimates the channel of N spatial dimensions in the training signal part used for the space division process of the data part in the sounding packet fed back from the second terminal such that the channel of the N-M remaining spatial dimensions is not estimated, thereby reducing to the size of a channel estimation circuit to of the order of $(N/M)^2$.

In more detail, the first terminal transmits the wireless communication signal for requesting the transmission of the training signal with a format having N data streams. The second terminal implicitly or explicitly represents the sounding packet which excites the channel of N spatial dimensions in the training signal part used for the space division process of the data part and allows a training signal for exciting the channel of N-M remaining spatial dimensions to be unrelated to the space division of the signal. The second terminal returns the sounding packet with the staggered format according to the processing capability of the first terminal by the implicit or explicit instruction.

In such a case, when receiving the sounding packet, the first terminal excites the channel of N spatial dimensions in the training signal part used for the space division process of the data part to estimate N×N channel matrix, but does not need to process the training signal for exciting the channel of the N-M remaining spatial dimensions. No problem is caused in the channel estimation or the data symbol demodulation although the part attached to the end of the training is not processed in order to excite the N-M remaining channels. Accordingly, the size of the channel matrix estimation circuit as well as the circuit of the transmission weight matrix computation means for beamforming can be reduced to of the order of $(N/M)^2$.

According to the embodiment of the invention, it is possible to an excellent wireless communication system, wireless communication apparatus and wireless communication method, which are capable of performing communication at a high transmission rate by a beamformed packet by allowing a terminal which operates as a beamformer to divide spatial stream training series transmitted from a terminal which operates as a beamformee, to construct an estimation channel matrix from the divided training series, and to suitably obtain a transmission channel matrix for beamforming on the basis of the channel matrix.

According to the embodiment of the invention, it is possible to an excellent wireless communication system, wireless communication apparatus and wireless communication method, which are capable of suitably performing beamforming without increasing a processing capability of channel estimation or a computing capability of a matrix for beamforming in the beamformer even when the number of antennas of a terminal which is a beamformer is smaller than that of a beamformee.

In the wireless communication system according to the embodiment of the invention, if the number of antennas of the beamformer is smaller than that of the beamformee when the beamforming based on the backward channel estimation result is performed by the implicit feedback, the beamformer can perform computation for reducing the beamforming dimension to reduce the size of the circuit.

The other objects, features and advantages of the invention will become apparent and more readily appreciated from the following description of the embodiments, taken in conjunction with the accompanying drawings.

DETAILED DESCRIPTION OF PREFERRED EMBODIMENTS

Hereinafter, embodiments of the invention will be described in detail with reference to the accompanying drawings.

A wireless communication system according to the embodiment of the invention performs closed loop type MIMO communication and more particularly, a terminal of a transmitter side performs beamforming by a procedure of performing feedback for a channel matrix, for example, by a procedure of the "implicit feedback" defined in the EWC HT MAC specification.

In the implicit feedback, a terminal which operates as a beamformer divides spatial stream training transmitted from a terminal which operates as a beamformee, constructs a backward estimation channel matrix from the divided training series, and performs beamforming of a transmission packet using a transmission channel matrix for beamforming obtained on the basis of the channel matrix, thereby performing communication.

However, a processing capability for performing channel estimation or a processing capability for computing a matrix for beamforming is given to a terminal in consideration of the number of its own antennas. Accordingly, if the number of antennas of the beamformee is large, transmitted spatial stream training exceeds a channel estimation maximum dimension allowed by the terminal such that the spatial stream training may not be divided or a matrix for beamforming may not be computed from a channel matrix having a high dimension number.

In contrast, in the wireless communication system according to the embodiment of the invention, when the beamforming based on the backward channel estimation result is performed according to the implicit feedback, the beamformer receives the sounding packet fed back from the beamformee, divides the sounding packet into M spatial stream trainings; constructs an N×M backward channel matrix, and obtains an N×N transmission weight matrix for beamforming at the time of the forward data transmission using the N×N channel matrix composed of N columns of M columns included in the backward channel matrix in consideration of the number of its own antennas, that is, performs computation for decreasing the beamforming dimension.

In such a case, the terminal operating the beamformer needs to include processing capability corresponding to a rated maximum number of antennas (for example, four in the IEEE specification) in a circuit module for estimating a channel matrix, but can reduce the size of the circuit for computing the transmission weight matrix for beamforming from the estimated channel matrix to of the order of $(N/M)^2$.

Figure 1:
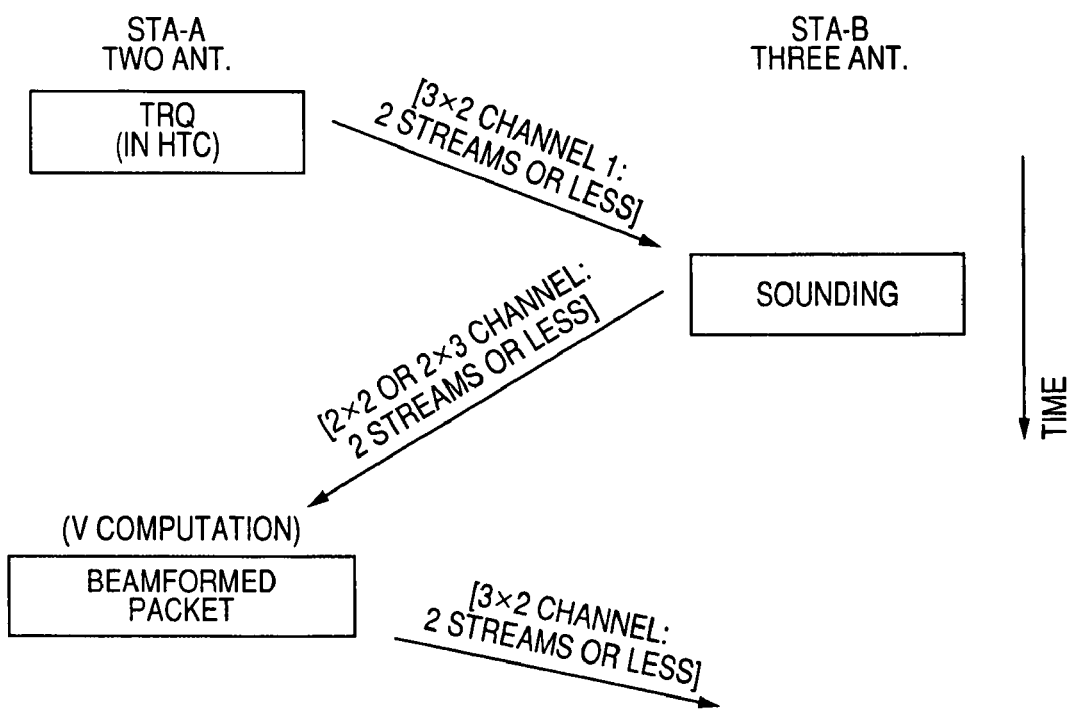
FIG. 1 is a schematic diagram of an operation procedure of implicit feedback according to an embodiment of the invention.

FIG. 1 is a schematic diagram of an operation procedure of the implicit feedback according to the embodiment of the invention. Here, the number of antennas of a STA-A as the beamformer or a channel estimation maximum dimension is 2 and the number of antennas of a STA-B as the beamformee is 3. The procedure is performed on the basis of the EWC MAC specification.

First, the STA-A requests the STA-B to transmit the training series. A request packet uses a 3×2 channel. In a transmission capability of the STA-A and a reception capability of the STA-B, the number of spatial streams used by the transmission capability of the STA-A having a lower number is restricted and 1 or 2 spatial streams is used.

The STA-B returns a sounding packet including the training series in response to the request packet. At this time, since the STA-B transmits the packet with the number of spatial streams which does not consider the channel estimation maximum dimension of the STA-A, a 3×2 backward channel is excited. When receiving the sounding packet, the STA-A generates 2×3 backward estimation channel matrix, but obtains a 2×2 transmission weight matrix for beamforming at forward data transmission. That is, since the computation for decreasing the beamforming dimension is performed, the size of the circuit for computing the transmission weight matrix for beamforming can be reduced to of the order of $(N/M)^2$ (in this case, N=2 and M=3).

Thereafter, a request of the sounding packet and the channel estimation and the computation of the transmission weight matrix for beamforming due to the reception of the sounding packet are repeatedly performed whenever the STA-A performs the beamforming.

Hereinafter, the configuration of the wireless communication system according to the embodiment of the invention will be described in detail.

Figure 2:
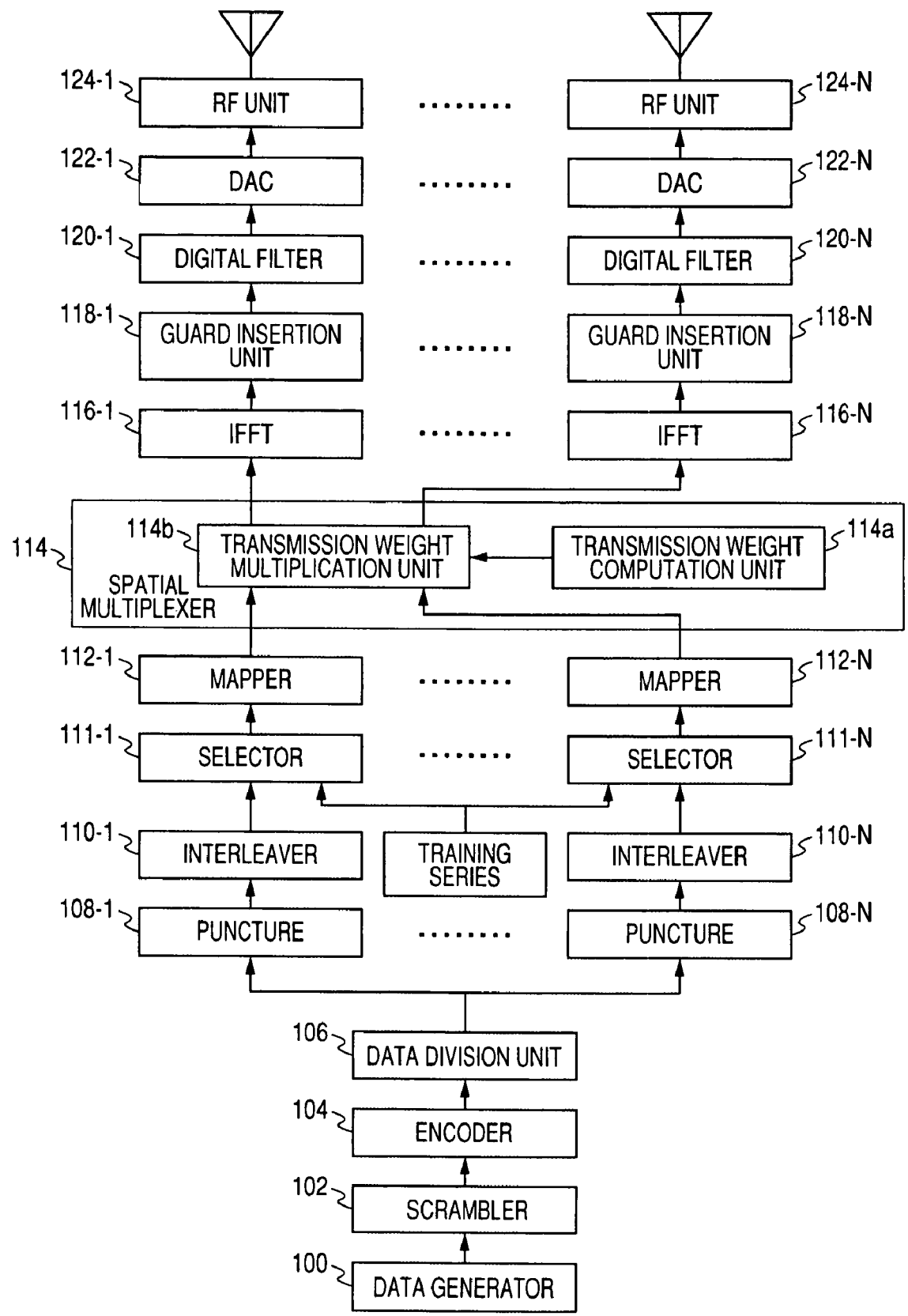
FIG. 2 is a view showing the configuration of a transmitter side of a wireless communication apparatus which can operate as a STA-A (or STA-B) in a wireless communication system shown in FIG. 1.
Figure 3:
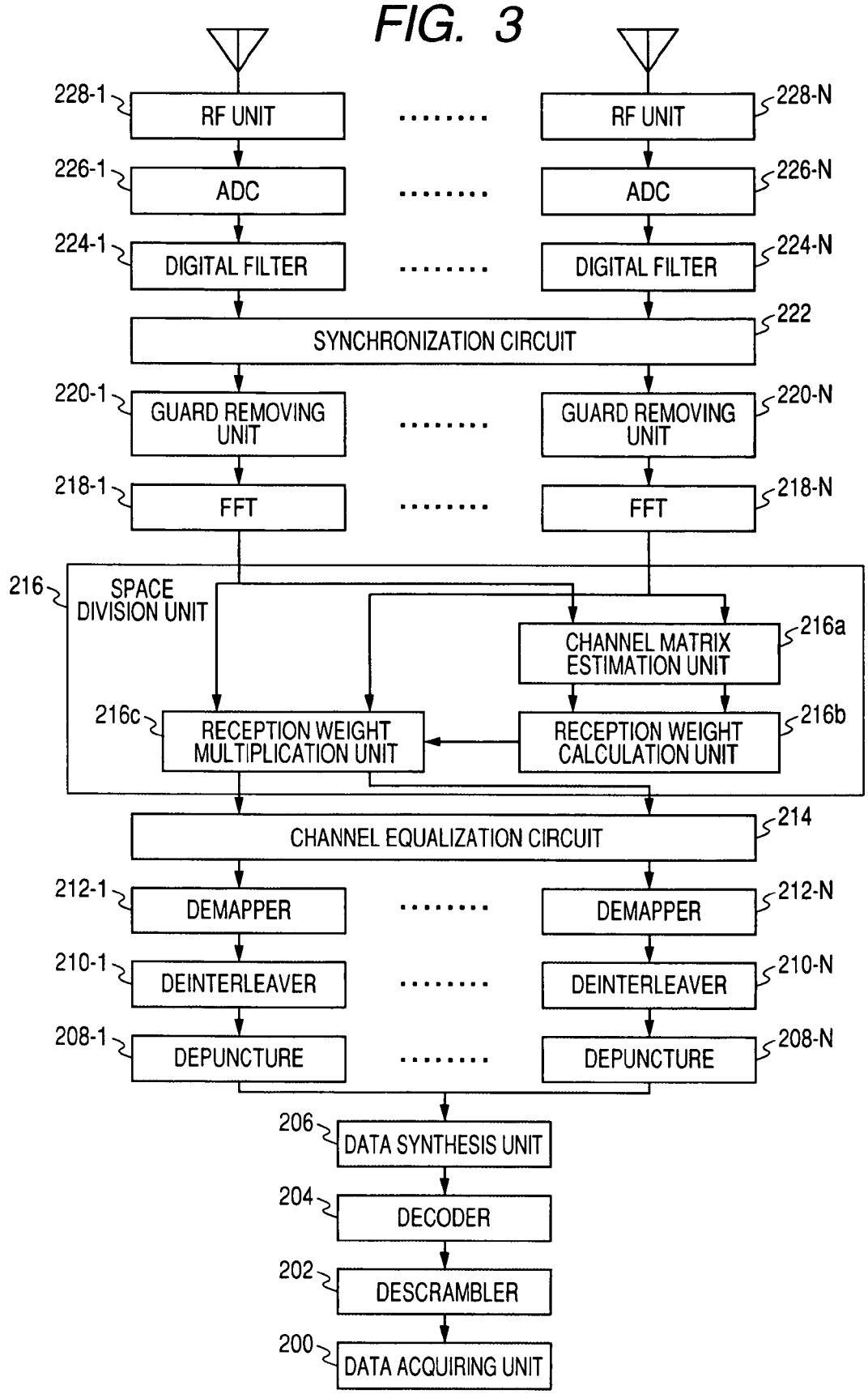
FIG. 3 is a view showing the configuration of a receiver side of the wireless communication apparatus which can operate as the STA-A (or STA-B) in the wireless communication system shown in FIG. 1.

FIGS. 2 and 3 show the configurations of the transmitter and the receiver of a wireless communication apparatus which can operate as the STA-A (or the STA-B) in the wireless communication system shown in FIG. 1, respectively. The number of antennas of the STA-A is N and N is at most four, for example, on the basis of the IEEE specification, but only two antennas are shown in the figures in order to avoid conflict of the figures.

Transmission data supplied to a data generator 100 is scrambled by a scrambler 102. Subsequently, error correction encoding is performed by an encoder 104. For example, in the EWC HT PHY specification, the scrambling and encoding methods are defined according to the definition of the IEEE 802.11a. The encoded signal is input to a data division unit 106 to be divided into the transmission streams.

In each transmission stream, the transmission signal is punctured by a puncture 108 according to a data rate applied to each stream, interleaved by an interleaver 110, mapped to an IQ signal space by a mapper 112, thereby becoming a conjugate baseband signal. In the EWC HT PHY specification, an interleaving scheme expands the definition of the IEEE 802.11a such that the same interleaving is not performed among a plurality of streams. As the-mapping scheme, BPSK, QPSK, 16 QAM or 64 QAM is applied according to the IEEE 802.11a.

A selector 111 inserts the training series into the transmission signal of each interleaved spatial stream at an adequate timing and supplies it to the mapper 112. The training series include the HT-STF for improving the AGC in the MIMO system and the HT-LTF for performing the channel estimation for each input signal which is spatially modulated in the receiver side. For example, in the HT-LTF, the training series of each the transmission stream is inserted with the staggered format.

When the beamforming is performed with respect to the transmission signal, in a spatial multiplexer 114, a beamforming transmission weight matrix computation unit 114a calculates the transmission weight matrix V for beamforming from the channel matrix H using a computation method such as the singular value decomposition and a transmission weight matrix multiplication unit 114b multiplies the transmission vector having the transmission streams as the element by the transmission weight matrix V, thereby performing the beamforming. When transmitting the sounding packet, the beamforming is not performed with respect to the transmission signal.

Figure 4:
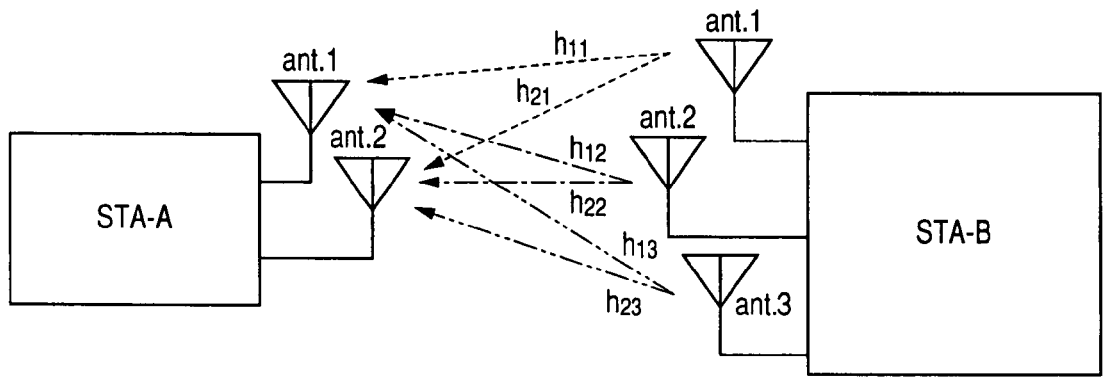
FIG. 4 is a view illustrating a method of estimating a channel matrix in the STA-A by feedback of a training signal from the STA-B.

The beamforming transmission weight matrix computation unit 114a computes the transmission weight matrix using the backward channel matrix $H_{BA}$ constructed by allowing a channel matrix estimation unit 216a (described below with reference to FIG. 3) of the receiver side to divide the spatial stream training transmitted from the beamformee. For example, as shown in FIG. 4, if the number of antennas of the STA-A is N=2 and the number of antennas of the STA-B is M=3. the backward channel matrix $H_{BA}$ becomes a 2×3 matrix as expressed by Equation 7.

$$H_{BA} = \begin{pmatrix} h_{11} & h_{21} & h_{31} \\ h_{12} & h_{22} & h32 \end{pmatrix}$$

Equation 7

If the bidirectional channels are reciprocal, the forward channel matrix $H_{AB}$ becomes the transposed matrix of $H_{BA}$ as expressed by Equation 8.

$$H_{AB} = \begin{pmatrix} h_{11} & h_{12} \\ h_{21} & h_{22} \\ h_{31} & h_{32} \end{pmatrix}$$

Equation 8

The STA-A has two transmission antennas, that is, two streams. Accordingly, the beamforming transmission weight matrix computation unit 114a performs the singular value decomposition with respect to a 2×2 channel matrix composed of any two rows of 3×2 $H_{AB}$ and computes a 2×2 transmission weight matrix for beamforming. That is, it is possible to reduce the size of the circuit of the beamforming transmission weight matrix computation unit 114a by performing the computation for decreasing the beamforming dimension.

An inverse fast Fourier transform unit (IFFT) 116 converts the subcarriers arranged in a frequency region into a time axis signal. A guard insertion unit 118 adds a guard interval. A digital filter 120 performs band limitation, a DA converter (DAC) 122 converts the band-limited signal into an analog signal, and an RF unit 124 up-converts the analog signal to an adequate frequency band and transmits the converted signal to the channel through each transmission antenna. In the implicit feedback, on the assumption that the channel characteristics are reciprocal, the RF unit 124 performs calibration.

Meanwhile, the data which reaches the receiver through the channel is analog-processed in an RF unit 228, converted into a digital signal by an AD converter (ADC) 226, and input to a digital filter 224, in each reception antenna branch. In the implicit feedback, on the assumption that the channel characteristics are reciprocal, the RF unit 228 performs calibration.

Subsequently, a synchronization circuit 222 performs processes including packet detection, timing detection and frequency offset correction and a guard removing unit 220 removes the guard interval added to the top of the data transmission section. The fast Fourier transform unit (FFT) 218 transforms a time axis signal to a frequency axis signal.

A space division unit 216 performs a space division process of the spatially multiplexed reception signal. In particular, a channel matrix estimation unit 216a divides the spatial stream training included in the PHY header of the sounding packet and constructs an estimation channel matrix H from the training series.

In the implicit feedback, when the apparatus operates as the beamformer, the estimation channel matrix H obtained by the channel matrix estimation unit 216a is sent to the beamforming transmission weight matrix computation unit 114a of the transmitter side as the backward channel matrix. When the number M of the spatial streams of the training signal fed back from the beamformee is larger than the number N of transmission streams (the number of the antenna branches) of the transmitter, excessive process is performed in the channel matrix estimation unit 216a and thus the size of the circuit increases. The operation amount necessary for the estimation of the channel matrix is reduced using the feedback from the beamformee which is performed with the staggered format and the detailed description will be described later.

In the implicit feedback procedure, when the apparatus operates as the beamformee, an antenna reception weight matrix computation unit 216b computes an antenna reception weight matrix W on the basis of the channel matrix H obtained by the channel matrix estimation unit 216a. In a case where the beamforming is performed with respect to the reception packet and the estimation channel matrix is subjected to the singular value decomposition, the estimation channel matrix becomes equal to an UD (see Equation 6) and the antenna reception weight W is calculated therefrom. A method of calculating the antenna reception weight W is not limited to the singular value decomposition and a calculation method such as zero forcing or MMSE may be used. An antenna reception weight matrix multiplication unit 216c multiplies the reception vector having the reception streams as the element by the antenna reception weight matrix W to perform spatial decoding of the spatial multiplexed signal, thereby obtaining independent signal series for each stream.

A channel equalization circuit 214 performs remaining frequency offset correction and channel tracking with respect to the signal series of each stream. A demapper 212 demaps the reception signal on the IQ signal space, a deinterleaver 210 performs deinterleaving, and a depuncture 208 performs depuncturing at a predetermined data rate.

A data synthesis unit 206 synthesizes a plurality of reception streams to one stream. This data synthesis process performs an operation which is opposed to the data division performed in the transmitter side. A decoder 204 performs error correction decoding, a descrambler 202 performs descrambling, and a data acquiring unit 200 acquires the reception data.

In a case where the wireless communication apparatus operates as the terminal of the data transmission side in the closed loop type MIMO communication, when the beamforming is performed to initiate the transmission of the data packet or the transmission weight matrix for beamforming is desired to be updated, the training request (TRQ) of the training series is issued with respect to the beamformee and the sounding packet fed back from the beamformee is received. The sounding packet is composed of M spatial streams and the N×M backward channel matrix is constructed. In consideration of the number N of its own antennas (for example, N<M), an N×N transmission weight matrix for beamforming at the time of the forward data transmission is obtained using an N×N channel matrix composed of N columns of M columns included in the backward channel matrix.

Accordingly, the wireless communication apparatus performs the computation for decreasing the beamforming dimension such that the size of the circuit of the transmission weight matrix computation unit 114a for beamforming can be reduced to of the order of $(N/M)^2$ from the estimated channel matrix.

The above-described procedure can reduce the size of the circuit for computing the transmission weight matrix for beamforming, but may not reduce a circuit module for estimating the channel.

It is possible to reduce the circuit module for estimating the channel by allowing the beamformee to transmit the sounding packet with the staggered format.

The staggered format described herein is the format of the sounding packet obtained by temporally dividing the training signal for exciting the channel of the spatial dimensions larger than or equal to the number of streams of the data and a training signal part used for a space division process of a data part. When a terminal having a plurality of antennas performs spatially multiplexing transmission, the transmission is not performed using all antenna branches. However, the beamformee returns the training signal even through the stream, which is not used for the space division process of the data part, to excite the channel of all the spatial dimensions when feeding back the sounding packet.

The beamformer transmits the wireless communication signal for requesting the transmission of the training signal with a format having N data streams. In the beamformee, it is implicitly or explicitly represented that the channel of N spatial dimensions is excited in the training signal part used for the space division process of the data part and a training signal for exciting the channel of N-M remaining spatial dimensions is allowed to be not related to the space division of the signal, with respect to the sounding packet. The beamformee returns the sounding packet with the staggered format according to the processing capability of the beamformer by the implicit or explicit instruction.

In this case, when receiving the sounding packet the beamformer performs the channel estimation using only the training signal part used for the space division process of the data part and disallows the training signal for exciting the channel of the spatial dimension larger than or equal to the number of streams of the data transmitted with temporal separation to be processed, thereby reducing the size of the channel estimation circuit.

Figure 5:
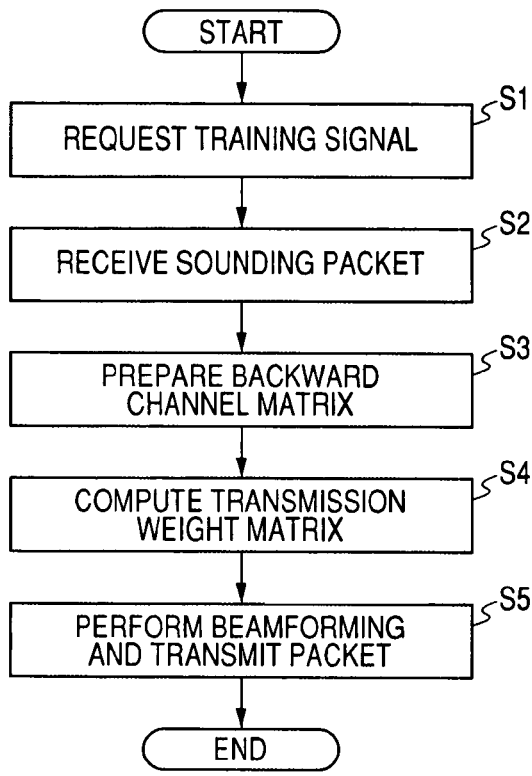
FIG. 5 is a flowchart illustrating a process when the wireless communication apparatuses shown in FIGS. 2 and 3 operate as a beamformer on the basis of the implicit feedback.

FIG. 5 is a flowchart illustrating a process when the wireless communication apparatuses shown in FIGS. 2 and 3 operate as the initiator, that is, the beamformee, on the basis of the implicit feedback. Here, the number of antennas of the beamformer is N and the number of antennas of the beamformee is M.

First, the apparatus transmits a request for the training signal to the receiver which operates as the beamformee (step S1). In more detail, a TRQ bit included in the link adaptation control field of the HT control field of the MAC frame is placed.

At this time, a wireless communication signal which requests the transmission of the training signal is transmitted with a format having N data streams. The second terminal implicitly or explicitly represents the sounding packet which excites the channel of N spatial dimensions in the training signal part used for the space division process of the data part and allows a training signal for exciting the channel of N-M remaining spatial dimensions to be unrelated to the space division of the signal.

The sounding packet transmitted from the receiver is received in response to the request (step S2) and the training series received by the antennas are divided into streams to prepare a backward channel matrix (step S3).

The sounding packet fed back from the beamformee is constructed to excite the channel of all M spatial dimensions and the beamformer performs estimation of N×M channel matrix which exceeds the processing capability considered from the number of its own antennas. When the sounding packet has the packet configuration in which the channel of N spatial dimensions is excited by the staggered format in the training signal part used for the space division process of the data part and a training signal for exciting the channel of N-M remaining spatial dimensions is allowed to be unrelated to the space division of the signal with respect to the sounding packet, the channel of N spatial dimensions is excited in the training signal part used for the space division process of the data part to estimate N×N channel matrix, but the training signal for exciting the channel of the N-M remaining spatial dimensions does not need to be completely processed in step S3. Accordingly, the size of the circuit of the transmission weight matrix computation unit 114*a* for beamforming can be reduced to of the order of $(N/M)^2$.

Subsequently, a transmission weight matrix for beamforming at the time of forward data transmission is obtained using the backward channel matrix (step S4).

When the staggered format is employed, if the estimation using the training signal part used for the space division process of the data par is performed using the backward channel matrix, the channel matrix becomes an N×N channel matrix. Thus, the N×N channel matrix is transposed to obtain the forward channel matrix and the forward channel matrix is subjected to the singular value decomposition to obtain a transmission weight matrix V. When the staggered format is not employed, the backward channel matrix becomes N×M channel matrix. Thus, Only N columns are extracted from M columns or only N rows of M×N channel transposed therefrom are extracted to construct the N×N forward channel matrix, the forward channel matrix is subjected to the singular value decomposition to obtain the transmission weight matrix V.

The beamforming is performed using the transmission weight matrix for beamforming in the transmission vector having the transmission signal from the antennas as the element and the data packet is transmitted to the receiver (step S5). It is possible to make an ideal spatial orthogonal channel by applying the transmission antenna weight on the basis of the channel matrix and performing adequate beamforming which is directed to the receiver.

Figure 6:
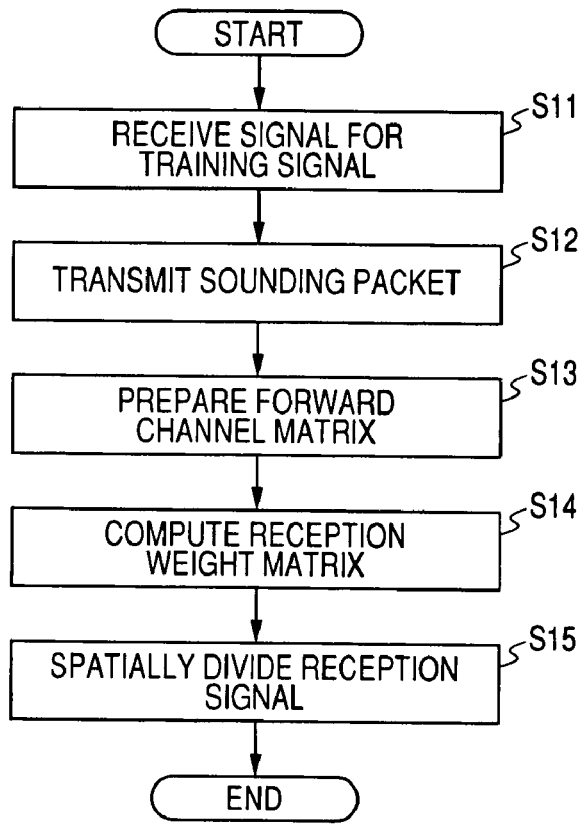
FIG. 6 is a flowchart illustrating a process when the wireless communication apparatuses shown in FIGS. 2 and 3 operate as a beamformee on the basis of the implicit feedback.

FIG. 6 is a flowchart illustrating a process when the wireless communication apparatuses shown in FIGS. 2 and 3 operate as the receiver, that is, the beamformee, on the basis of the implicit feedback. Here, the number of antennas of the beamformer is N and the number of antennas of the beamformee is M.

First, a request of a training signal is received from the initiator operating as the beamformer (step S11). In more detail, the TRQ bit included in the link adaptation control field of the HT control field of the MAC frame received from the initiator is placed.

The sounding packet is returned to the initiator in response to the request (step S13).

When the staggered format is employed, since the number N of data streams included in the wireless communication signal received in the step S1 implicitly or explicitly represents the sounding packet which excites the channel of N spatial dimensions in the training signal part used for the space division process of the data part and allows a training signal for exciting the channel of N-M remaining spatial dimensions to be unrelated to the space division of the signal, the sounding packet is returned in the format according to this instruction in the step S2.

The initiator divides the training series received by the N antennas to prepare the backward channel matrix and obtains the transmission weight matrix for beamforming upon the forward data transmission using the backward channel matrix. The beamforming is performed in the transmission vector having the transmission signals from the N antennas as the element using the transmission weight matrix for beamforming and the data packet is transmitted.

The wireless communication apparatus operating as the beamformee divides the spatial stream training received from the initiator and constructs the forward estimation channel matrix (step S13) and obtains the reception weight matrix from the channel matrix (step S14). A method of computing the reception weight matrix, a ZF method or an MMSE method may be used or a $D^{-1}U^H$ computed from matrices U and D obtained by performing the singular value decomposition with respect to the channel estimation matrix may be used.

When the N antennas receive the data packet from the initiator, the reception vector composed of the reception signals for the payload part is multiplied with the reception weight matrix to perform spatial decoding of the spatial multiplexing signal and the signal series which are independent in each stream are obtained (step S15). By the beamforming, communication can be performed at a high transmission rate even in a place where the packet was hard to be received in the past.

Hereinafter, the implicit feedback procedure when the sounding packet of the staggered format is used will be described. For simplification of description, an example of direct mapping of the streams to the antenna branches is employed, but the invention is not limited to this.

Figure 7:
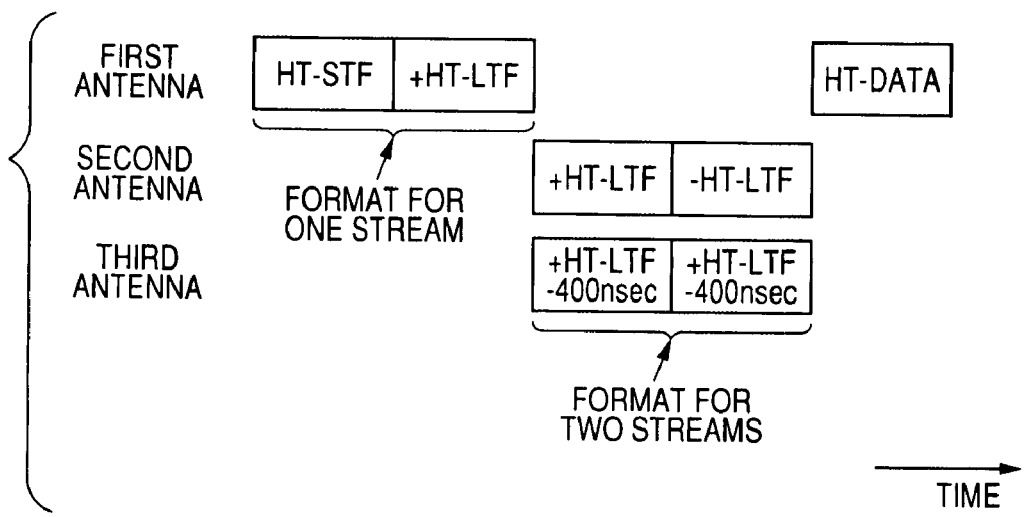
FIG. 7 is a view showing a format example of a staggered sounding packet.

FIG. 7 shows a format example of the staggered sounding packet when data of one stream is transmitted from the beamformee having three antennas. Here, it is assumed that the direct mapping is used.

A HT-STF (short training field) is a training symbol for improving automatic gain control (AGC) in the MIMO system, which includes QPSK-modulated OFDM signals of 52 tones. A HT-LTF (long training field) is a training symbol for performing the channel estimation for each input signal which is spatially modulated in the receiver side, which includes BPSK-modulated OFDM signals of 56 tones. These are training signals defined in a HT mode of the EWC specification. A value of −400 nsec which is described in the HT-LTF simultaneously transmitted fro a third antenna is a cyclic shift delay amount which is provided in order to avoid unintended beamforming when identical or similar signals are transmitted through different spatial streams. That is, it is possible to reduce correlation between the transmission antenna branches using cyclic delay diversity (CDD) which shifts and connects a time axis wavelength of an OFDM symbol sent from the third antenna by −400 nanoseconds to reduce the generation of undesired directional characteristics.

In the shown example, one stream is transmitted with a format having a data stream, but, with a temporal separation therefrom, training signals for exciting the channel of the remaining spatial dimension are transmitted from the other two antennas which are not used for the space division process of the data part.

Figure 8:
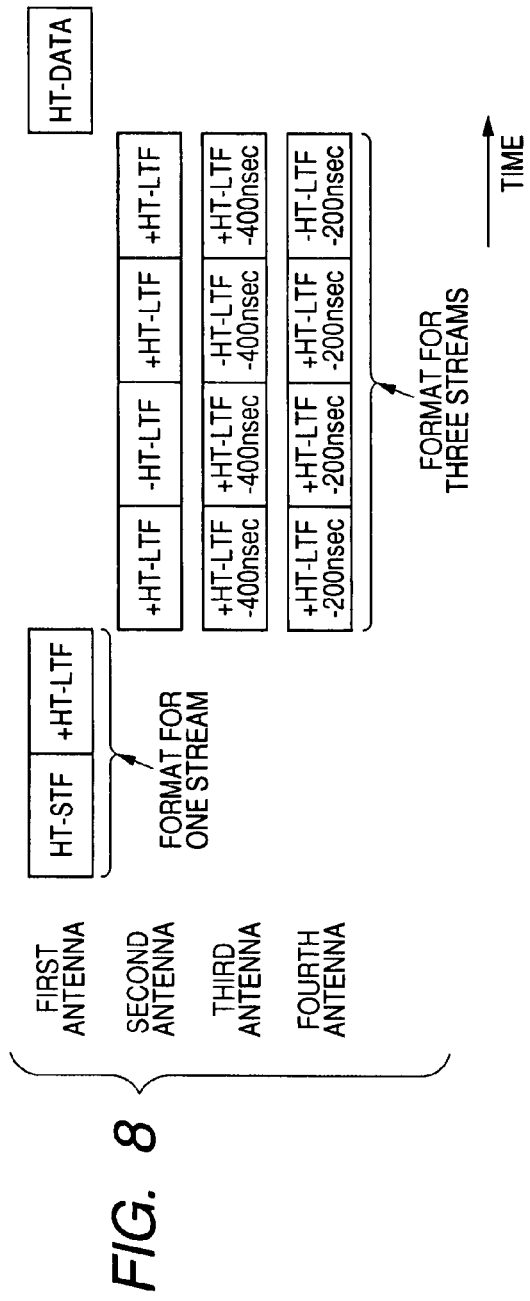
FIG. 8 is a view showing a format example of a staggered sounding packet.

FIG. 8 shows a format example of the staggered sounding packet when data of one stream is transmitted from the beamformee having four antennas. Here, it is assumed that the direct mapping is used.

In the shown example, one stream is transmitted with the format having the data stream and, with a temporal separation therefrom, the training signals for exciting the channel of the remaining spatial dimension are transmitted from the other three antennas which are not used for the space division process of the data part. In the current EWC specification, it is defined that four HT-LTFs are used in the training of three streams.

Figure 9:
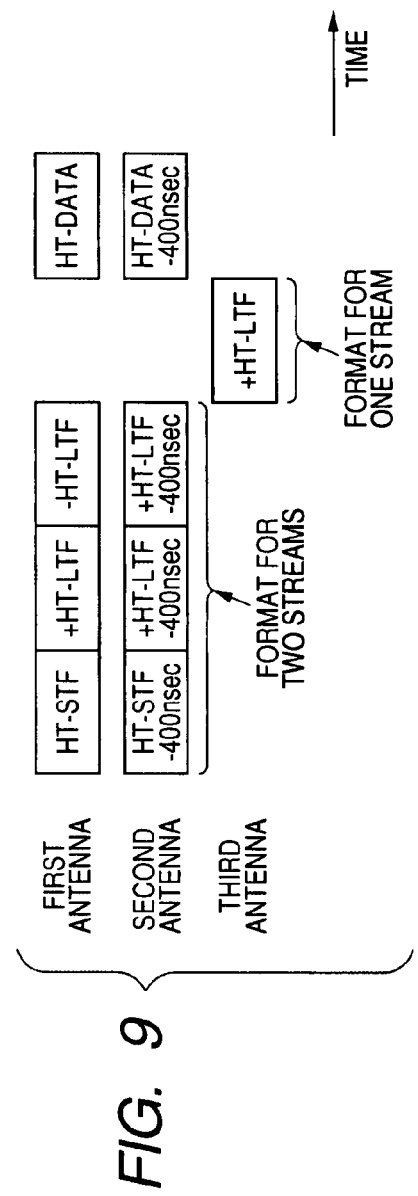
FIG. 9 is a view showing a format example of a staggered sounding packet.

FIG. 9 shows a format example of the staggered sounding packet when data of two streams is transmitted from the beamformee having three antennas. Here, it is assumed that the direct mapping is used.

In the shown example, two streams are transmitted with the format having the data stream and, with a temporal separation therefrom, the training signals for exciting the channel of the remaining spatial dimension are transmitted from the other one antenna which is not used for the space division process of the data part.

Figures 10, 11:
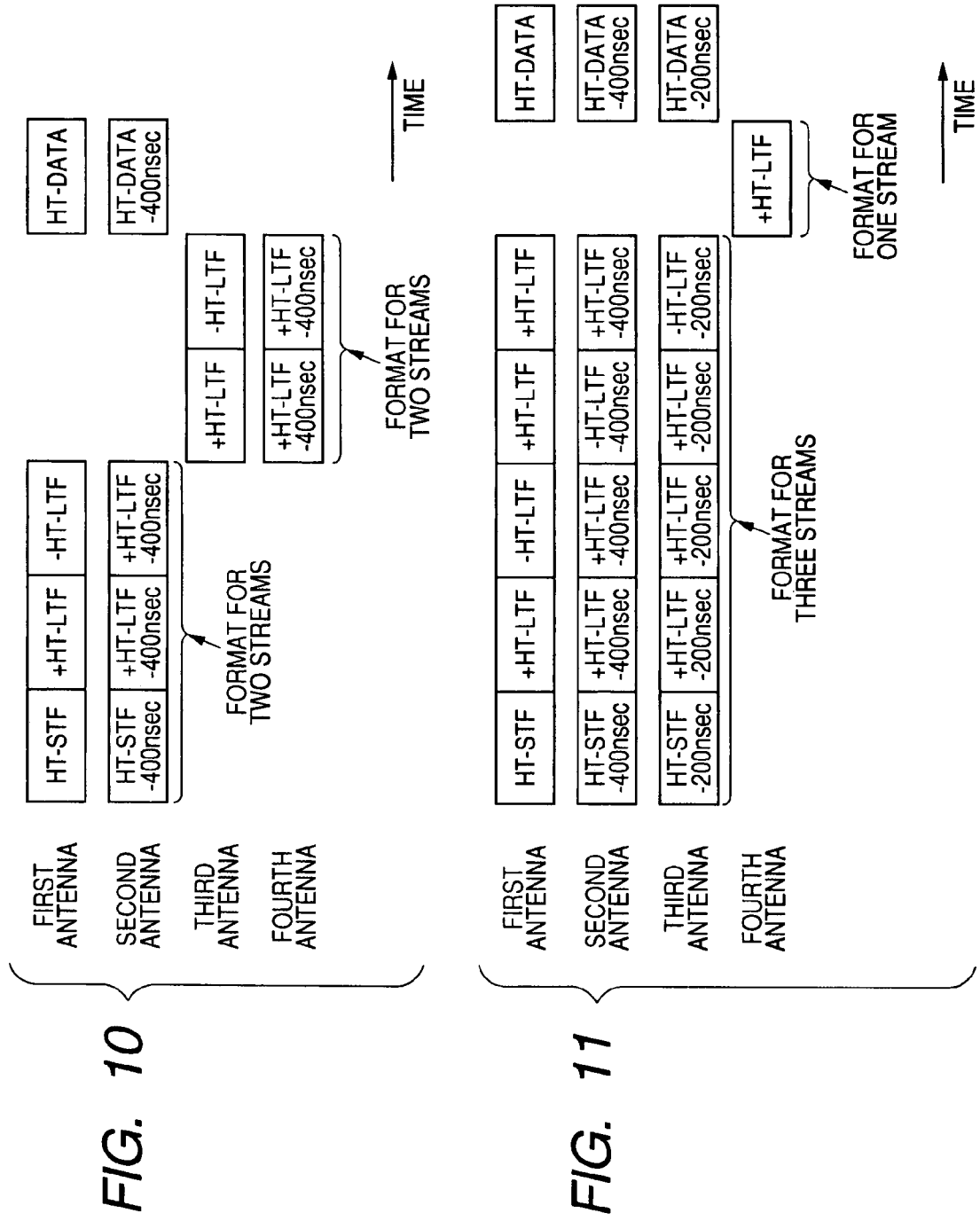
FIG. 10 is a view showing a format example of a staggered sounding packet.
FIG. 11 is a view showing a format example of a staggered sounding packet.
Figures 12, 13, 14:
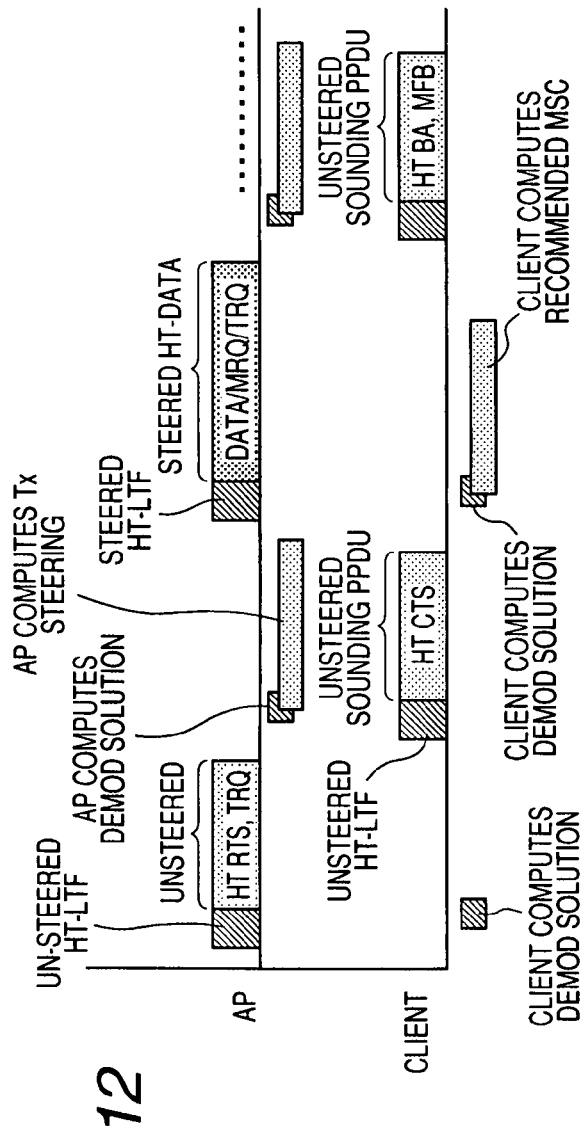
FIG. 12 is a view illustrating a frame exchange procedure for transmitting beamforming from an access point to a client terminal by the implicit feedback.
FIG. 13 is a view showing a format of a HT control field of an MAC frame defined in the IEEE-802.11.
FIG. 14 is a view showing a format of a link adaptation control field in the HT control field shown in FIG. 13.
Figure 15:
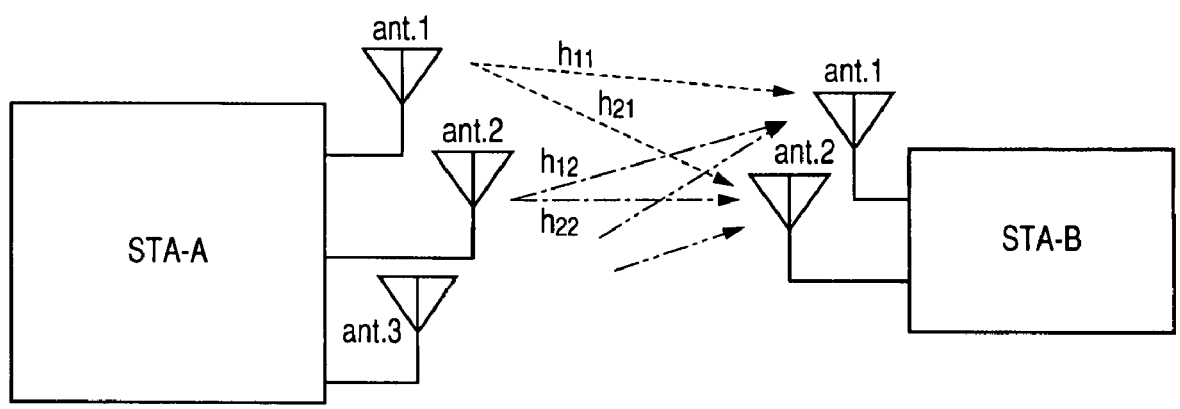
FIG. 15 is a view illustrating a calculation process for allowing the beamformer to perform the beamforming using training series from the beamformee according to the implicit feedback.

FIG. 10 shows a format example of the staggered sounding packet when data of two streams is transmitted from the beamformee having four antennas. Here, it is assumed that the direct mapping is used.

In the shown example, two streams are transmitted with the format having the data stream and, with a temporal separation therefrom, the training signals for exciting the channel of the remaining spatial dimension are transmitted from the other two antennas which are not used for the space division process of the data part.

FIG. 11 shows a format example of the staggered sounding packet when data of three streams is transmitted from the beamformee having four antennas. Here, it is assumed that the direct mapping is used.

In the shown example, three streams are transmitted with the format having the data stream and, with a temporal separation therefrom, the training signals for exciting the channel of the remaining spatial dimension are transmitted from the other one antenna which is not used for the space division process of the data part. In the current EWC specification, it is defined that four HT-LTFs are used in the training of three streams.

As can be seen from FIGS. 7 to 11, in a wireless communication apparatus in which the number of antennas is two and the maximum number of estimatable streams is two, the reception of the data part (payload) of the packet and the estimation of a necessary channel matrix are in the processing capability range which is considered upon designing, when the staggered sounding packet has the structure shown in FIG. 7, 9 or 10. FIG. 8 shows the staggered sounding packet of one stream, which is not suitably applied to the invention.

In a wireless communication apparatus in which the number of antennas is three and the maximum number of estimatable streams is three, the reception of the staggered sounding packet shown in FIGS. 7 to 11 and the estimation of a necessary channel matrix are in the processing capability range which is considered upon designing. In a wireless communication apparatus in which the maximum number of streams is three, the specification in which four HT-LTFs are received and the channel estimation of three streams is performed therefrom is originally requested and no problem is caused in the structure of the apparatus.

As can be seen from FIG. 7 to 11, when the number M of antennas in a initiator of the sounding packet (that is, the terminal which operates the beamformee in the implicit feedback) is larger than the number N of antennas in a receiver of the sounding packet (that is, the terminal which operates as the beamformer in the implicit feedback), the beamformer can selectively estimate only necessary N streams without performing the channel estimation of M streams (that is, without preparing an N×M channel matrix), by suitably using the staggered format.

In the EWC specification, a zero length frame (ZLF) (also called a null data packet (NDP) and hereinafter referred to as "ZLF") in which an MAC frame-length is 0 is defined and it is defined that the ZLF is used as the format of the sounding packet (the ZLF is a frame dedicated to the sounding packet, which includes only a PHY header part including the training series for exciting the channel and does not include an MAC frame). However, when the sounding is performed using the ZLF, four trainings need to be obtained in order to perform channel estimation of one stream from the training signal composed of M streams and thus a circuit burden of the channel matrix estimation unit 216a of the beamformer may not be reduced.

If the beamformer includes two antennas and the beamformee includes four antennas, the circuit burden of the beamformer may not be reduced although the staggered sounding packet of the frame format shown in FIG. 8 is used. No problem is caused in the channel estimation from training (HT-LTF) of a first stream, but, in order to estimate the channel with respect to one stream, four HT-LTFs of the other three streams which are not used for the space division process of the data part transmitted with a temporal separation therefrom needs to be computed. Thus, the size of the circuit of the beamformee which can support at most two streams increases.

When the beamformer includes two antennas and the beamformee includes three antennas, the staggered sounding packet of the frame format shown in FIG. 7 or 9 is used.

When the sounding packet shown in FIG. 9 is fed back from the beamformee, the beamformer can estimate the channel of two spatial dimensions necessary for the beamforming using the training signal part in a reception stream of the first to second antennas used for the space division of the data part. Since the reception streams of the third to fourth antennas which are not used for the space division of the data part transmitted with temporal separation do not need to be processed, the problem that the size of the circuit increases in the beamformee which can support at most two streams is not caused. No problem is caused in the channel estimation or the data symbol demodulation although the part attached to the end of the training is not processed in order to excite the third to fourth channels.

When the sounding packet shown in FIG. 7 is fed back from the beamformee, the beamformer first estimates the channel using the training signal part in a reception stream of the first antennas used for the space division of the data part. However, two HT-LTF in each of the other two streams, which are not used for the space division of the data part transmitted with the temporal separation, needs to be processed, in order to estimate the channel with respect to one stream. The channel estimation of a 2×2 matrix may be performed from two HT-LTFs and the channel estimation of the other one stream may be performed. However, in this case, since the channel estimation result of a first stream needs to be buffered in another place, the size of the circuit slightly increases compared with the case shown in FIG. 9 which the buffer is not needed.

As another example, when the beamformer includes three antennas and the beamformee includes four antennas, the staggered sounding packet of the frame format shown in FIG. 8, 10 or 11 is used.

When the sounding packet of the frame format shown in FIGS. 8 and 10 is used, as described above, the channel estimation is performed without a problem, but there is a problem that the channel estimation result of first one or two stream needs to be buffered in another place. When the sounding packet of the frame format shown in FIG. 11 is used, the beamformer can estimate the channel of two spatial dimensions necessary for the beamforming using the training signal part in a reception stream of the first to third antennas used for the space division of the data part. Since the reception stream of the fourth antenna which is not used for the space division of the data part transmitted with the temporal separation does not need to be processed, the problem that the size of the circuit increases in the beamformer which can support at most three streams is not caused. No problem is caused in the channel estimation or the data symbol demodulation although the part attached to the end of the training is not processed in order to excite the fourth channel.

Although the case where the beamformer transmits the wireless communication signal for requesting the transmission of the training signal in a format having N data streams to perform an implicit or explicit instruction with respect to the beamformee is described above, this case is described.

In a MAC layer protocol defined in the IEEE 802.11, a response frame (for example, a CTS packet for a RTS packet or an ACK packet for a DATA packet) is returned at the same transmission rate as a previous packet when the previous packet is transmitted at a basic rate.

For example, when MCS=8 (that is, BPSK, encoding rate ½, 2 streams) is included in the basic rate and the beamformer transmits the training request using the RTS or DATA packet at MCS=8, the beamformee necessarily returns the CTS or ACK packet at MCS=8.

That is, as shown in FIG. 9 or 10, since the beamformee returns the training signal for exciting the channel of the N-M remaining spatial dimensions using the staggered packet composed of the format unrelated to the space division of the signal, it is convenient in the channel estimation in the beamformer.

Accordingly, in such a communication system, the beamformer can transmit the packet for requesting the training using N streams corresponding to the number of antennas of the apparatus to implicitly or explicitly specify the format of the staggered sounding packet returned from the beamformee as described above. As a result, the beamformer can simplify the configuration of the channel matrix estimation unit 114a. The MCS (modulation and coding scheme) is a value for deciding a modulation method, an encoding method and the number of streams, which is one of information described in the PHY header of the HT packet Although the invention will be described in detail with reference to the specific embodiment, it is apparent to those skilled in the art that the embodiment may be modified or substituted without departing from the scope, of the invention.

Although the embodiment in which the invention applies to the MIMO communication system according to the EWC specification in the IEEE 802.11n is described in the present specification, the scope of the invention is not limited to the embodiment. As the MIMO communication system using the stream which is spatially multiplexed from a first terminal including N antennas to a second terminal including M antennas, it is possible to suitably apply the invention to various types of communication systems in which the beamformer performs the beamforming using the training signal transmitted from the beamformee.

In the present specification, for simplification of description, although the embodiment in which the transmission terminal performs the "direct mapping" for directly mapping the streams to the antenna branches is described, the invention is applicable to a case of employing "spatial expansion" or a conversion method in which the streams do not one-to-one correspond to the antenna branches.

Although the embodiment which is applied to the IEEE 802.11n which is extension standard of the IEEE 802.11 is described mainly in the present specification, the invention is not limited to the embodiment. The invention is applicable to a variety of wireless communication systems using an MIMO communication method such as a mobile WiMax (Worldwide Interoperability for Microwave) based on the IEEE 802.16e, the IEEE 802.20 which is a high-speed wireless communication standard for a mobile object, the IEEE 802.15.3c which is a high-speed wireless PAN (Personal Area Network) using 60 GHz (milliwave) band, a wireless HD (High Definition) which transmitting an uncompressed HD image using wireless transmission of 60 GHz (milliwave) band, and a fourth generation (4G) mobile telephone.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication system which performs data transmission from a first terminal including N antennas to a second terminal including M antennas using spatially multiplexed streams (N is an integer of 2 or more and M is an integer of 1 or more), the system comprising:

training request means for requesting transmission of a training signal for exciting a backward channel from the first terminal to the second terminal;

training means for transmitting a packet including training series for exciting an N×M backward channel matrix from the second terminal to the first terminal in response to the request;

channel matrix preparing means for dividing the training series received by the antennas of the first terminal and constructing the backward channel matrix;

transmission weight matrix computation means for obtaining a N×N transmission weight matrix for beamforming at the time of forward data transmission using an N×N channel matrix composed of N columns included in the backward channel matrix in consideration of the number N of antennas of the first terminal, in a case of N<M; and beamforming means for performing beamforming in transmission signals from the antennas of the first terminal using the transmission weight matrix for beamforming when a data packet is transmitted from the first terminal to the second terminal.

2. The wireless communication system according to claim 1, wherein the training request means allows the first terminal to request the training series by a TRQ bit included in a link adaptation control field of a HT control field of an MAC frame, wherein the training means transmits a sounding packet including the training series for exciting the backward channel matrix, and wherein the transmission weight computation means divides a spatial stream training of the sounding packet received by the first terminal and constructs the backward channel matrix from the divided training series.

3. The wireless communication system according to claim 2, wherein the training means performs feedback of the sounding packet from the second terminal by a staggered format for temporally dividing a training signal part used for a space division process of a data part and the training signal for exciting a channel of a spatial dimension larger than or equal to the number of streams of data.

4. The wireless communication system according to claim 3, wherein the training request means transmits a wireless communication signal for requesting the transmission of the training signal with a format having N data streams from the first terminal to the second terminal, and wherein the training means feeds back the sounding packet which excites the channel of N spatial dimensions in the training signal part used for the space division process of the data part and allows the training signal for exciting the channel of N-M remaining spatial dimensions to be unrelated to the space division of the signal from the second terminal to the first terminal.

5. The wireless communication system according to claim 3, wherein the channel matrix preparing means excites the channel of N spatial dimensions in the training signal part used for the space division process of the data part to estimate the N×N channel matrix, but does not process the training signal for exciting the channel of N-M remaining spatial dimensions, when the first terminal receives the sounding packet.

6. A wireless communication apparatus which includes N antennas and performs data transmission using spatially multiplexed streams to a second terminal including M antennas (N is an integer of 2 or more and M is an integer of 1 or more), the apparatus comprising:
training request means, for requesting the second terminal to transmit a training signal for exciting a backward channel;
channel matrix preparing means for dividing training series of the antennas for receiving a packet including the training series transmitted from the second terminal into streams and constructing the backward channel matrix in response to the request;
transmission weight matrix computation means for obtaining an N×N transmission weight matrix for beamforming at the time of forward data transmission using an N×N channel matrix composed of N columns included in the backward channel matrix in consideration of the number N of its own antennas, in a case of N<M; and
beamforming means for performing beamforming in transmission signals from the antennas using the transmission weight matrix for beamforming when a data packet is transmitted to the second terminal.

7. The wireless communication apparatus according to claim 6,
wherein the training request means allows the first terminal to request the training series by a TRQ bit included in a link adaptation control field of a HT control field of an MAC frame, and
wherein the channel matrix preparing means divides a spatial stream training of a sounding packet received by the antennas and constructs the backward channel matrix from the divided training series.

8. The wireless communication apparatus according to claim 7, wherein the channel matrix preparing means prepares a channel matrix from the sounding packet of a staggered format for temporally dividing a training signal part used for a space division process of a data part and the training signal for exciting a channel of a spatial dimension larger than or equal to the number of streams of data.

9. The wireless communication apparatus according to claim 8, wherein the training request means transmits a wireless communication signal for requesting the transmission of the training signal with a format having N data streams, and requests the second terminal to feed back the sounding packet which excites the channel of N spatial dimensions in the training signal part used for the space division process of the data part and allows the training signal for exciting the channel of N-M remaining spatial dimensions to be unrelated to the space division of the signal from the second terminal to the first terminal.

10. The wireless communication apparatus according to claim 9, wherein the channel matrix preparing means excites the channel of N spatial dimensions in the training signal part used for the space division process of the data part to estimate the N×N channel matrix, but does not process the training signal for exciting the channel of N-M remaining spatial dimensions, in the received sounding packet.

11. A wireless communication method in a wireless communication apparatus which includes N antennas and performs data transmission using spatially multiplexed streams to a second terminal including M antennas (N is an integer of 2 or more and M is an integer of 1 or more), the method comprising the steps of:
requesting the second terminal to transmit a training signal for exciting a backward channel;
dividing training series of the antennas for receiving a packet including the training series transmitted from the second terminal into streams and constructing the backward channel matrix in response to the request;
obtaining an N×N transmission weight matrix for beamforming at the time of forward data transmission using an N×N channel matrix composed of N columns included in the backward channel matrix in consideration of the number N of its own antennas, in a case of N<M; and
performing beamforming in transmission signals from the antennas using the transmission weight matrix for beamforming when a data packet is transmitted to the second terminal.

12. A wireless communication system which performs data transmission from a first terminal including N antennas to a second terminal including M antennas using spatially multiplexed streams (N is an integer of 2 or more and M is an integer of 1 or more), the system comprising:
a training request unit which requests transmission of a training signal for exciting a backward channel from the first terminal to the second terminal;
a training unit which transmits a packet including training series for exciting an N×M backward channel matrix from the second terminal to the first terminal in response to the request;
a channel matrix preparing unit which divides the training series received by the antennas of the first terminal and constructs the backward channel matrix;
a transmission weight matrix computation unit which obtains a N×N transmission weight matrix for beamforming at the time of forward data transmission using an N×N channel matrix composed of N columns included in the backward channel matrix in consideration of the number N of antennas of the first terminal, in a case of N<M; and
a beamforming unit which performs beamforming in transmission signals from the antennas of the first terminal using the transmission weight matrix for beamforming when a data packet is transmitted from the first terminal to the second terminal.

13. A wireless communication apparatus which includes N antennas and performs data transmission using spatially multiplexed streams to a second terminal including M antennas (N is an integer of 2 or more and M is an integer of 1 or more), the apparatus comprising:
a training request unit which requests the second terminal to transmit a training signal for exciting a backward channel;
a channel matrix preparing unit which divides training series of the antennas for receiving a packet including the training series transmitted from the second terminal into streams and constructs the backward channel matrix in response to the request;

a transmission weight matrix computation unit which obtains an N×N transmission weight matrix for beamforming at the time of forward data transmission using an N×N channel matrix composed of N columns included in the backward channel matrix in consideration of the number N of its own antennas, in a case of N<M; and a beamforming unit which performs beamforming in transmission signals from the antennas using the transmission weight matrix for beamforming when a data packet is transmitted to the second terminal.

* * * * *